United States Patent
Chouinard et al.

(10) Patent No.: US 8,694,959 B2
(45) Date of Patent: Apr. 8, 2014

(54) MULTI LANGUAGE EDITOR

(75) Inventors: Julien Chouinard, Magog (CA); Gilles Brunet, St-Hubert (CA); Denis Lavallee, St-Constant (CA); Chan-Dara Trang, Brossard (CA); Jean-Francois Laliberte, Boucherville (CA); Frédéric Darveau, St-Hubert (CA); Olivier Larouche, Boucherville (CA)

(73) Assignee: ICS Triplex ISaGRAF Inc., Brossard, Quebec (CA)

( * ) Notice: Subject to any disclaimer, the term of this patent is extended or adjusted under 35 U.S.C. 154(b) by 1083 days.

(21) Appl. No.: 12/242,659

(22) Filed: Sep. 30, 2008

(65) Prior Publication Data

US 2010/0083220 A1    Apr. 1, 2010

(51) Int. Cl.
*G06F 9/44* (2006.01)

(52) U.S. Cl.
USPC ............ 717/110; 717/106; 717/108; 717/113

(58) Field of Classification Search
None
See application file for complete search history.

(56) References Cited

U.S. PATENT DOCUMENTS

| | | | | |
|---|---|---|---|---|
| 6,792,595 | B1 * | 9/2004 | Storistenau et al. | 717/110 |
| 7,000,191 | B2 * | 2/2006 | Schmitt et al. | 715/764 |
| 7,020,869 | B2 * | 3/2006 | Abrari et al. | 717/108 |
| 7,054,694 | B2 * | 5/2006 | Fujinami et al. | 700/29 |
| 7,171,646 | B2 * | 1/2007 | Charisius et al. | 717/100 |
| 7,178,129 | B2 * | 2/2007 | Katz | 717/108 |
| 7,802,238 | B2 * | 9/2010 | Clinton | 717/136 |
| 7,958,488 | B2 * | 6/2011 | Cifra | 717/106 |
| 8,307,332 | B2 * | 11/2012 | Lee et al. | 717/110 |
| 2003/0236577 | A1 * | 12/2003 | Clinton | 700/10 |
| 2005/0071809 | A1 * | 3/2005 | Pulley | 717/108 |
| 2006/0026559 | A1 * | 2/2006 | Gunturi et al. | 717/110 |
| 2006/0129976 | A1 * | 6/2006 | Brand et al. | 717/109 |
| 2006/0253835 | A1 * | 11/2006 | Saelens | 717/108 |
| 2007/0006149 | A1 * | 1/2007 | Resnick et al. | 717/116 |
| 2007/0044073 | A1 * | 2/2007 | Kornerup et al. | 717/113 |
| 2007/0061778 | A1 * | 3/2007 | Sadlek | 717/113 |
| 2007/0150859 | A1 * | 6/2007 | Kodosky et al. | 717/106 |
| 2007/0220485 | A1 * | 9/2007 | Lee et al. | 717/110 |
| 2007/0234271 | A1 * | 10/2007 | Winkler et al. | 717/100 |
| 2007/0240080 | A1 * | 10/2007 | Eldridge et al. | 715/835 |
| 2007/0256053 | A1 * | 11/2007 | Torgerson et al. | 717/110 |
| 2008/0189638 | A1 * | 8/2008 | Mody et al. | 715/771 |
| 2008/0320438 | A1 * | 12/2008 | Funto et al. | 717/106 |
| 2009/0064103 | A1 * | 3/2009 | Shih | 717/113 |
| 2009/0217200 | A1 * | 8/2009 | Hammack et al. | 715/810 |

OTHER PUBLICATIONS

Erich Oswald, Leonardo: A Framework of Modeling and Editing Graphical Components, 2000, pp. 147-159.*
Roswitha Bardohl, Application of Graph Transformation to Visual Languages, 1997, pp. 4-8 and 15-21.*
Rafael H. Bordini, A Survey of Programming Languages and Platforms for Multi-Agent Systems, 2005, pp. 34-39.*

* cited by examiner

Primary Examiner — Thuy Dao
Assistant Examiner — Mongbao Nguyen
(74) Attorney, Agent, or Firm — Amin, Turocy & Watson, LLP

(57) ABSTRACT

The claimed subject matter provides a system and/or method that facilitates creating a portion of an industrial process. An interface component can receive a first portion of data associated with a first programming language and a second portion of data associated with a second programming language, wherein the first programming language is independent and disparate of the second programming language. An editor component can create at least one of a portion of an industrial process or a portion of a mixed language object by enabling the combination of the first portion of data and the second portion of data independent of the respective programming languages.

34 Claims, 10 Drawing Sheets

MULTI LANGUAGE EDITOR

TECHNICAL FIELD

The subject invention relates to industrial control systems and, more particularly, to utilizing multiple programming languages to create an industrial process.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers and devices employed within automation industrial environments have fallen behind recent technological advances to which the automation industry has maintained stride for stride. Conventional controllers and devices are rigid and inflexible such that software associated therewith must be specifically tailored and/or programmed. In other words, each controller and/or device typically requires specific code or software in order to be utilized within an industrial process. Moreover, within the industrial automation industry, various programming languages exits and can be implemented to create and employ such processes. Adding to the complexity of programming controllers and devices is the inherent benefits and detriments of each programming language, wherein developers must choose among programming languages in order to create processes. Furthermore, mixing languages within a given platform can be a real problem when large applications or processes are constructed.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing two or more programming languages associated with a standard in order to generate a mixed language object. An editor component can allow a user to define shapes which create an underlying control solution. Thus, the shapes can operate as a macro function that can be a collection of other functions that have been selected to define a particular control solution. In general, the editor component can enable the employment of various programming languages in order to create a portion of a process independent of each programming language properties, characteristics, and the like. The editor component can allow the use of a stencil with respective shapes (e.g., a shape can be an object defined by at least one of a function or a method), wherein the stencil allows drag-and-drop of a shape to create a portion of a process. Such shapes can be of various programming languages. Moreover, the editor component can enable the creation of custom stencils with shapes and/or custom languages based on the combination of two or more programming languages. The editor component can further provide the ability to change display types, (e.g., windows style: Details, Icons with tool tips . . . ), support Drag and Drop, provide Scalable Panes, allow sorting each icon by their name, where each stencil can have its own Container Shape, import new stencils based on library hardware (XML), and allow OEMs to create their own stencils with their own shapes, for example.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
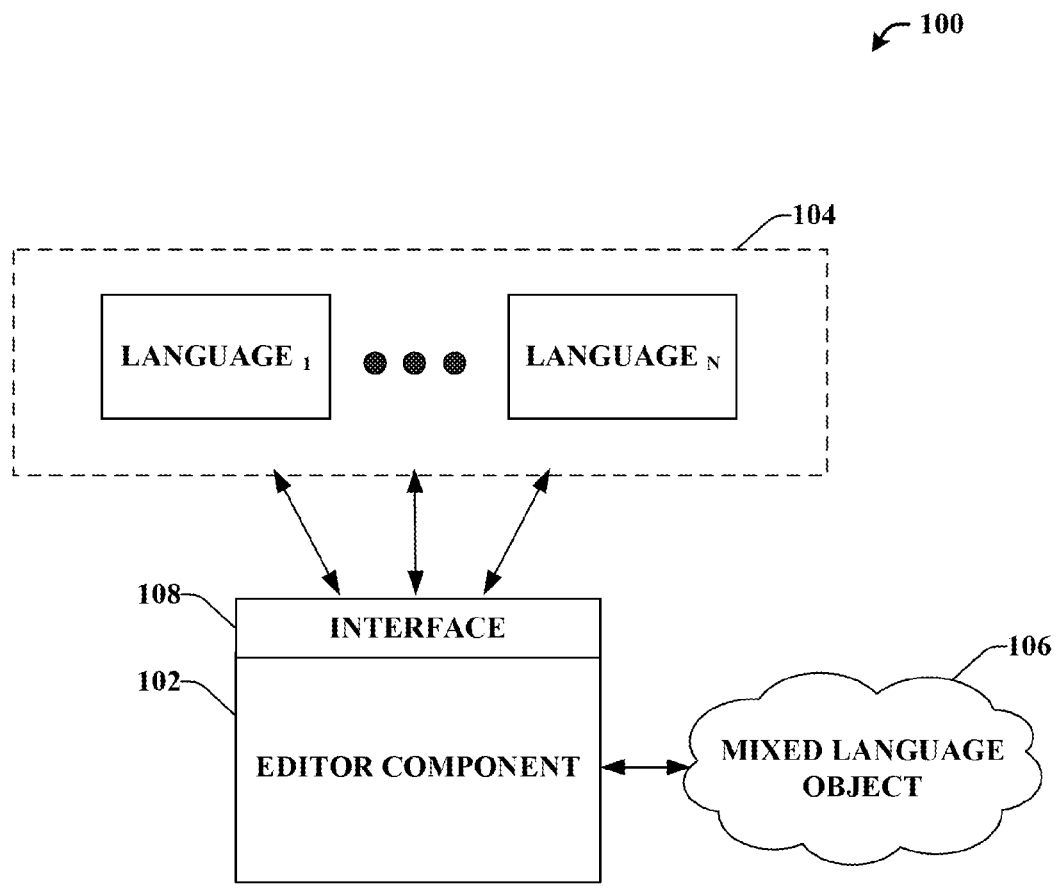
FIG. 1 illustrates a block diagram of an exemplary system that facilitates employing two or more programming languages associated with a standard in order to generate a mixed language object.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "system," "editor," "document," "panel," "interface," "builder," and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates employing two or more programming languages associated with a standard in order to generate a mixed language object. The system 100 can include an editor component 102 that can receive a two or more languages 104 in order to create a mixed language object 106 that can be employed as a portion of an industrial process. Typically, editors, programs, applications, compilers, and the like are capable of utilizing a single programming language for the generation of industrial processes. However, the editor component 102 can provide an environment for the implementation of a process with the combination of various programming languages associated with a standard. For example, the standard can be the IEC61131 Standard, the IEC61499 Standard, etc. Moreover, the editor component 102 can enable a first industrial programming language and a second industrial programming language to reside within a document (e.g., described and defined in more detail below) as well as enable the first industrial programming language and the second industrial programming language to interact with one another (e.g., programming languages share a set of common variables that can be accessed).

The editor component 102 can receive any suitable portion of data, wherein the portion of data can be defined in a programming language related to a standard in connection with an industrial environment. In particular, the editor component 102 can receive the portion of data via an interface component 108 (herein referred to as "the interface 108"). Moreover, the editor component 102 can receive data from the two or more languages 104, wherein there can be any suitable number of languages such as language 1 to language N, where N is a positive integer. By enabling the combination of the two or more languages, the editor component 102 can employ a language that is more beneficial for a portion of a process (e.g., a loop is difficult to be implemented in a graphical language, etc.). Furthermore, the visualization of a process can be more simplified by the editor component 102.

In general, the editor component 102 can provide a unique ability to mix two or more languages 104 in which a first language can be a graphical language and a second language can be a textual language. In other words, the editor component 102 can enable the combination of a graphical language and a textual language in order to create and/or modify an industrial process. For example, the language can be, but is not limited to being, a ladder diagram, a function block diagram, a structured text, an instruction list, a sequential function chart, 61499, any suitable programming language associated with a standard, any suitable programming language associated with an industrial process, etc.

In accordance with another aspect of the subject innovation, the editor component 102 can enable the creation of new languages based upon the unique combinations of the two or more languages 104. For example, a user can be combine a first graphical language and a second textual language to his or her liking, where such unique combination can be utilized as a user-defined programming language for an industrial process.

Moreover, the system 100 can include any suitable and/or necessary interface 108, which provides various adapters, connectors, channels, communication paths, etc. to integrate the editor component 102 into virtually any operating and/or database system(s). In addition, the interface 108 can provide various adapters, connectors, channels, communication paths, etc., that provide for interaction with the editor component 102.

Figure 2:
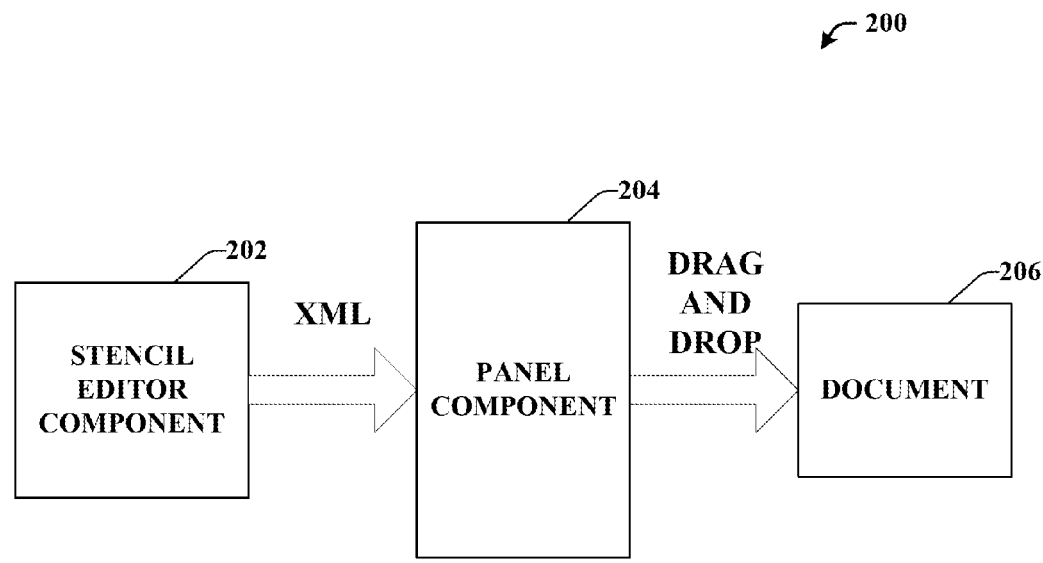
FIG. 2 illustrates a block diagram of an exemplary system that facilitates creating mixed language documents and/or objects.

FIG. 2 illustrates a system 200 that facilitates creating mixed language documents and/or objects. The system 200 can include a stencil editor component 202, a panel component 204, and a document 206. It is to be appreciated that the editor component (not shown) can include at least one of the stencil editor component 202, the panel component 204, and/or the document 206. Typically, mixing languages can be difficult in connection with building large applications. The subject innovation can avoid this by providing a structured and well defined program organization units (POUs) document. The subject innovation can enable the POU document to be separated into a different container. Such POU containers (e.g., also referred to as POU sections) can be specific to one or several languages (e.g., containers for ST language only and FBD language for all custom graphical language). A POU document can be composed of one or several POU containers.

The subject innovation can allow the creation of custom "Shapes" for a specific language that could be included inside FBD containers. For example, there are thousand of libraries that can be created and can allow coverage of many different markets such as Electrical and automation dedicated for specifications. The subject innovation can further provide an extremely powerful editor dedicated to automation market, but extensible to any market. Table 1 (below) can provide various definitions as utilized in the subject innovation:

TABLE 1

| Term | Definition | Other possible definition |
| --- | --- | --- |
| MLGE | Multi language editor (also referred to as the editor component 102). Editor that will support several language within the same page | Editors, editor component |
| MLGE Document | Windows control (can be docked or tabbed) that will contain all language containers. | Document |
| MLGE Panel | Windows Control that display stencil | Stencils Panel, panel component |
| MLGE Frame | MLGE Frame that will include several IEC container or HMI containers | Editor Frame |
| IEC Container | Receptacle that include IEC language rules, graphical rules. | POU Section |
| Stencil | Stencil is a group of Shape | Stencil, stencil editor component |
| Shape | Object defined by method, debug properties and interface | Object |

The editor component (not shown but discussed previously in FIG. 1) can be segmented into the stencil editor component 202, the panel component 204, and the document 206. The panel component 204 can be a container for stencils. The document 206 can be the container for POU body. The stencil editor component 202 can be a tool and/or application utilized to create a new object or shape for a stencil.

For example, the panel component 204 can be based on a tool box style or email application style. The display type can be changed (e.g., window style, details, icons with tool tips, etc.). The panel component 204 can further support drag and drop features as well as select and click features. It is to be appreciated that the stencil can also be organized by a user. In addition, the panel component 204 can be scalable (e.g., stencil can be displayed or not, etc.). Within a stencil, icons can be sorted by their name, as well as allowing a default position to be restored. Each stencil can have its own container shape. A custom stencil and shape can use the FBD container. The panel component 204 can support tool tips. Importation of new stencils can be further supported based on library hardware (e.g., extensible markup language (XML), etc.). An OEM can create a custom stencil with a custom shape. In addition, the ability to rename stencil and shape names can be enabled. Moreover, icons of shapes can be changed.

For example, a panel interface can include a stencil panel in list view. The stencil panel can include various sections (e.g., flow chart, sequential function chart, structure text, instruction list, function block diagram, ladder diagram, 61499, custom stencils, etc.) that can be expanded to expose options related to such section (e.g., exposing shapes related to such sections, etc.). In addition, the stencil panel can include tool tips and not display such shapes in a list view. In another example, the stencil panel can include custom library C functions. In still another example, the stencil panel can include custom stencil and custom items or shapes.

For example, XML can be received via a platform builder, wherein hardware definitions and features can be imported into a library. From such library, C function and function block can be imported into the stencil panel as a section including items and/or such shapes imported from the XML. In a particular example, a stencil builder (also referred to as the stencil editor component 202, which is discussed in more detail below) can provide XML in which a definition can be imported to the stencil panel and the body can be imported to a library. It is to be appreciated that importing is discussed in further detail in FIG. 4.

The document 206 can be an empty page that can be created by a user. The document 206 can be a frame that basically supports HMI container and IEC containers that include IEC programming language. The document 206 can support the following: single POU document that can support multiple languages; the POU document is a container referenced as, for instance, "MLGE Frame;" the POU document can support at least one of structured text (ST), instruction list (IL), ladder diagram (LD), function block diagram (FBD), sequential function chart (SFC), function chart (FC), 61499, etc. For example, the document 206 can support six (6) different containers for seven (7) languages (e.g., ST, IL, LD, FBD & custom & SFC & FC, 61499, HMI). Each can include specific rules for each (e.g., graphical, textual). Moreover, the custom shape can be set in an FBD container. The document 206 can support a container to be maximized or minimized. The document 206 can support the size of a container to be resized. The document 206 can further support at least two views of such containers (e.g., full page, structured form, free form). The document 206 can further support the following: a structured view in which a blank separator or new containers between existing containers can be inserted; a visual page border for printing; groupings of code to be set as a new shape; container execution order modification; container execution can be enabled and/or disabled; drag and drop, drag and drop can be validated by CAM; zoom in; zoom out; and snap to grid for containers.

The stencil editor component 202 (also referred to as the stencil builder) can provide the following: creation of new stencils; creation of new shapes (e.g., shape to be dropped into the document 206, shape can remain in tool box, etc.); define graphical properties of shape; define interface of the shape; associate new shape to existing function and/or function block; support custom shape view and 61131 shape view for 61131 function, function block, C function, or C function block; support for configurable shape (e.g., user definition of number of inputs and/or outputs, etc.); use of XML for description of shape; and shape to respect rules of input on the left side and output on the right side. Moreover, it is to be appreciated that the following definitions can be implemented for the stencil editor component 202:

TABLE 2

| Term | Definition | Other possible definition |
| --- | --- | --- |
| Stencil | Stencil is a group of Shape | Stencil |
| Shape | Object defined by method, debug properties and interface | Object |
| Body | Body of the shape is the source code of the shape that will describe his behavior | Source Code |
| Interface | Description of rules to be validate to connect to the shapes | Anchor, Parameters |
| Graphical Properties | Define the graphical characteristics that compose the Shape (Pixel, colors, default size..) | |
| Debug Properties | Define the characteristics of the Shape during Debug (Color Change, animation . . . ) | |
| Vector graphics | Define the properties of the image to not be a simple image and will give a better render when zooming or resizing | |
| Configurable Shape | Properties of Shape to be configure by the user (Have 3 anchors instead of 2). | |

For example, the stencil builder can be a tool (e.g., a plug-in to abstract automation model, etc.) that can allow the creation of custom shapes. For each shape, several aspects can be name of the shape, a graphical representation in a tool box, graphical representation in edition mode, graphical representation in debug or on line, interface (e.g., input and output of the function block), function or function block associated to the shape, data (e.g., data that can be used as local), graphical rules (e.g., anchors, parameters, etc.), extensibility of parameters (e.g., some operator can be extended to the number of parameters—example: addition of two numbers or six numbers), source code of the shape in read only, hidden, or free.

The graphical representation can be implemented utilizing the graphical editor (e.g., the editor component 102). The editor can be implemented and/or acquired from a third-party. The graphical editor can allow the definition of a shape and the ability to select color and how an anchor can be represented. The graphical editor can further define static representation and animated representation. Moreover, the graphical editor can allow the drawing of a complete shape using basic shapes (e.g., grouping existing shapes to create a more advanced object).

Upon defining a new shape, the editor component (not shown) can determine anchors of that shape and what type of data it needs. It is currently assimilate to a function block where user will determine the parameter of the function block. In other words, the editor can be employed (e.g., for parameter that function and function block).

Figure 3:
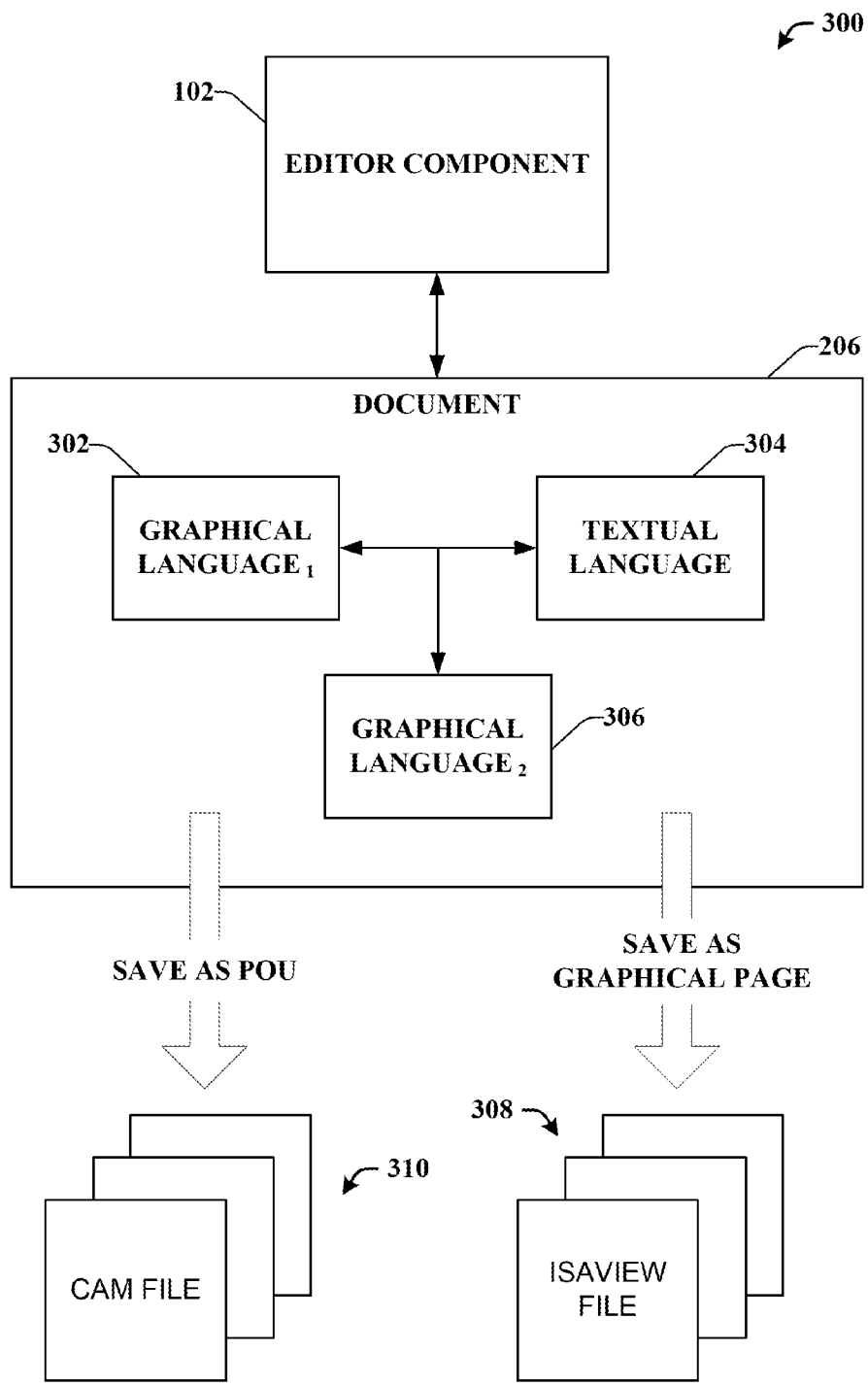
FIG. 3 illustrates a block diagram of an exemplary system that facilitates utilizing disparate industrial programming languages to generate graphical files and/or textured files (e.g., program files).

FIG. 3 illustrates a system 300 that facilitates utilizing disparate industrial programming languages to generate graphical files and/or textured files. The system 300 can include the editor component 102 that enables the combination of a plurality of programming languages in a seamless manner order to combine such portions of languages into an industrial process. For example, the editor component 102 can enable two or more programming languages within the document 206, wherein the programming languages can interact and/or communicate with one another as well as be associated with a particular industrial process. In system 300, the document 206 is depicted with a first graphical language 302, a textural language 304, and a second graphical language 306. It is to be appreciated that any suitable number and/or combination of graphical languages and/or textual languages can be included and/or combined within the document 206. Moreover, it is to be appreciated that the editor component 102 enables the seamless interaction of the languages as well as the sole inclusion of the languages within the document 206.

The document 206 can be employed to directly create a POU or a graphical page. It is to be appreciated that a blank page can be utilized and have the possibility to save such blank page as a graphical page or a POU. When saved into a visualization page (e.g., graphical), no IEC container may be present. Though, when saving into a POU, the graphical object may not be part of the IEC code but mainly as graphical representation for debugging. As depicted, when the document 206 is saved as a graphical page, the document 206 can be associated with an HMI (e.g., also referred to as a IsaView file 308) file 308. Also depicted, when the document 206 is saved as a POU, the document 206 can be associated with an IEC61131/IEC61499 (e.g., also referred to as a CAM file 310) file 310.

In another example, the document 206 can allow the creation of a new POU without any configuration or without any resource defined. For instance, the stencil panel can allow the defining of an application. The editor component 206 can allow the creation of any POU with any language at any time. From an empty page, the type of container can be decided. In an empty page, a shape can be dragged and the empty page (e.g., the document 206) can become a container for this particular language. For example, if a user is dragging a contact, the document can become a maximized LD container and will include automatically a ladder rung. The editor component 102 can further utilize a page border with the document 206. The border of the page (e.g., the document 206) can be displayed. For example, a user can display the border to see the entire page and how the POU is fitting within the boundaries.

Figure 4:
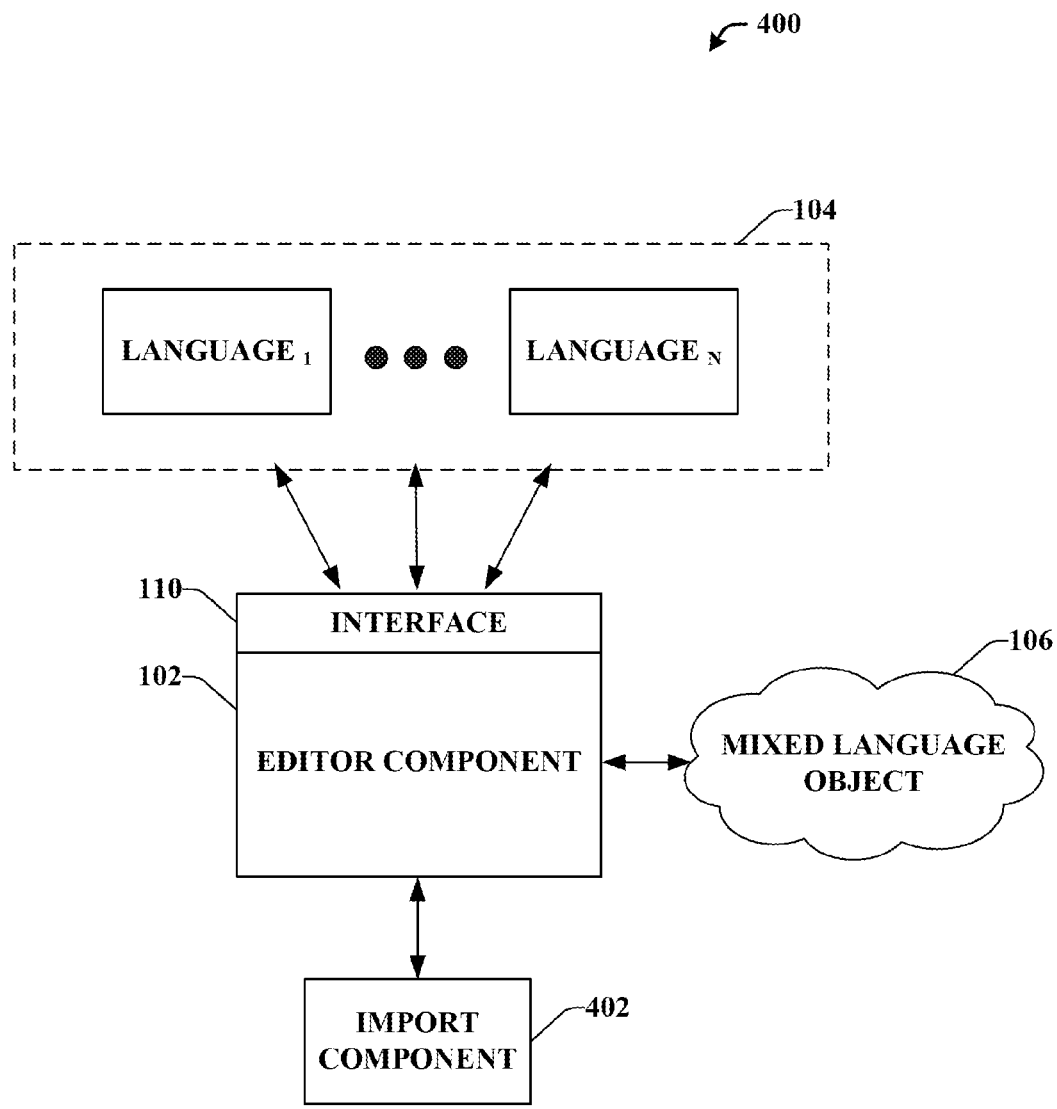
FIG. 4 illustrates a block diagram of an exemplary system that facilitates enabling universal and seamless importation of data from a plurality of disparate sources.

FIG. 4 illustrates a system 400 that facilitates utilizing enabling universal and seamless importation of data from a plurality of disparate sources. The system 400 can include an import component 402 that can facilitate the importation of data to create at least one of a shape, an object, the mixed language object 106, or a portion of process that includes a combination of programming languages. In particular, the import component 402 can allow the importation of shapes (e.g., ISaGRAF shapes, third-party shapes, etc.) into a stencil associated with the editor component 102.

The import component 402 can allow the shapes to be implemented into a stencil associated with the editor component 102. For example, the shape definition can be imported into the stencil. This definition can include the name, graphics, and/or tool tips. The whole new object can be imported into a library. The whole object can be the complete new object (e.g., the body, the interface, the graphical properties, etc.).

Figure 5:
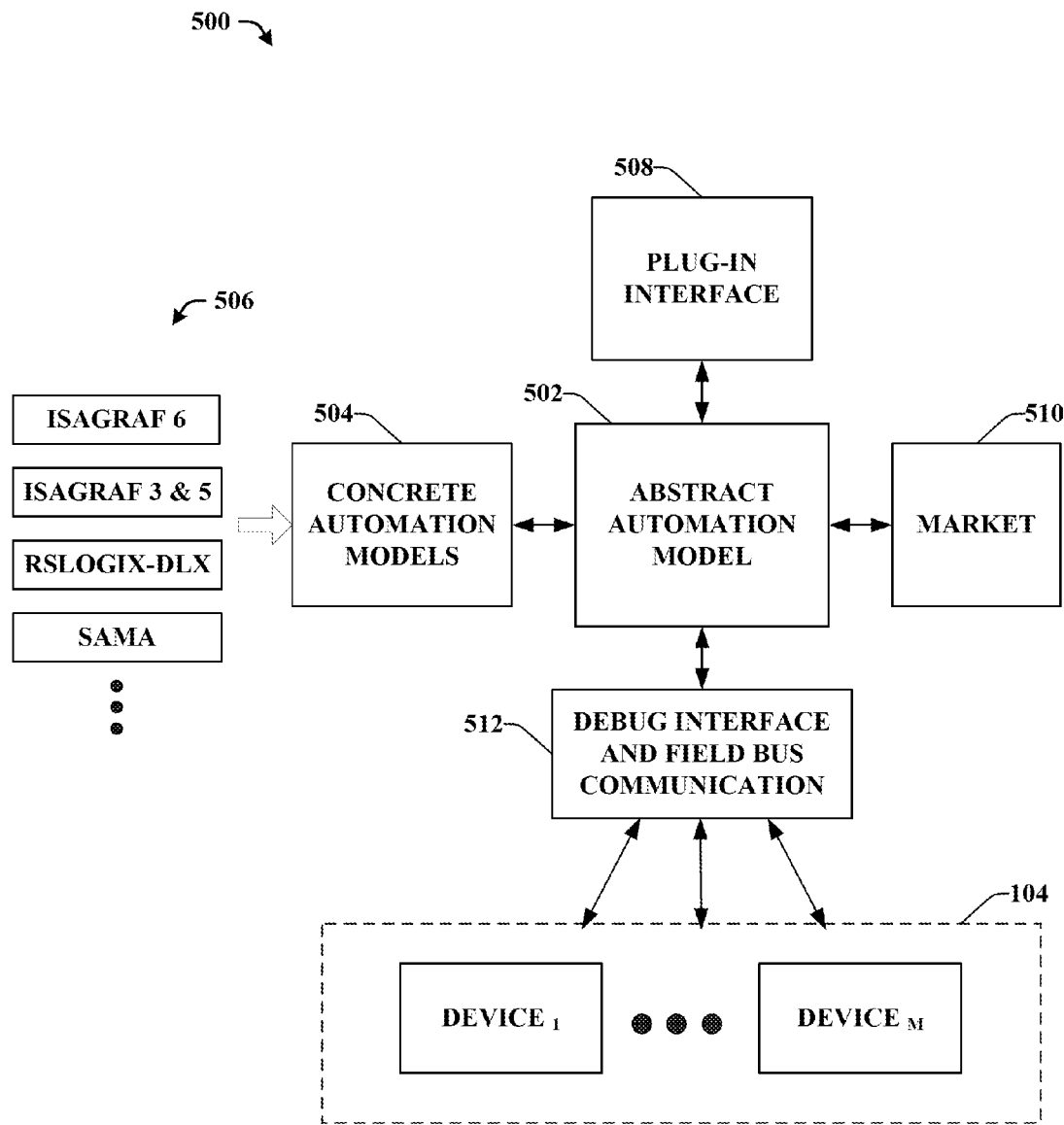
FIG. 5 illustrates a block diagram of an exemplary system that facilitates utilizing a universal model in accordance with the subject innovation.

FIG. 5 illustrates a system 500 that facilitates integrating utilizing a universal model in accordance with the subject innovation. The system 500 is a development platform that can employ generic programming models to enable developers to design control solutions in an abstract setting while facilitating code deployment and execution on substantially any type of end hardware platform. In one aspect, an Abstract Automation Model (AAM) 502 can be derived from common base model solutions or standards such as IEC 61131 and 61499, for example. Although any programming standard can be utilized for the underlying model, 61131 and 61499 support a majority of automation languages in the world today. The AAM 502 can define control structures that represent generic or abstract data objects having properties of a configuration, resource, program, and so forth. The AAM 502 can define integrity rules that ensure structural integrity such as a Tree structure (e.g., Parent to Child) or Project host configurations, which host resources, and so forth. The model also can define operations to update or query data. The AAM 502 can allow control software design to occur transparently and outside of the particular revision or type of development software that is utilized.

As part of a larger framework or development environment, a Concrete Automation Model (CAM) 504 can provide data interfaces associated with the generic data objects of the AAM 502 and according to a designated project format of differing development environments. For instance, various versions of a development program may have associated CAMs that link or map the respective versions to the underlying abstraction of the AAM 502. In another example, a particular hardware vendor may provide a CAM for a particular type of programming interface that is unique to the respective vendor. By providing the abstraction of the AAM 502 and mapping to any particular nuance of differing program environments via the CAM, developers can rapidly add new features according to the generic programming model provided by the AAM 502 yet efficiently support and convert to substantially any available development program. The AAM 502 can receive program commands from a plurality of programming versions 506 (e.g., ISaGRAF 1, 2, 3 . . . 6, RSLogix, etc.), where each version interfaces to the AAM 502 via an associated CAM 504. Plug-in development support can be provided by in-house or third-party developers by leveraging a plug-in interface 508 to increase the functionality of the AAM 502. Also, market applications (e.g., market 510) can also be supported in the AAM 502 that are designed or pre-packaged for known industrial solutions. When a control solution has been developed, this control solution (e.g., the AAM 502) can be compiled to run on substantially any control platform by leveraging a debug interface and field bus communication 512. The debug interface and field bus communication 512 can enable various devices 104 to seamless and universally interact with the AAM 502 regardless of the device type, make, model, location, etc. Moreover, it is to be appreciated that there can be any suitable number of devices from $device_1$ to $device_M$, where M is a positive integer.

In general, the editor component 102 can allow the seamless interaction and creation of shapes (e.g., custom, existing, etc.) within a single editor, wherein the creation of shapes can be derived from a plurality of programming languages. The editor component 102 can further enable the universal interaction between such programming languages in connection with the platform depicted in FIG. 5.

Figure 6:
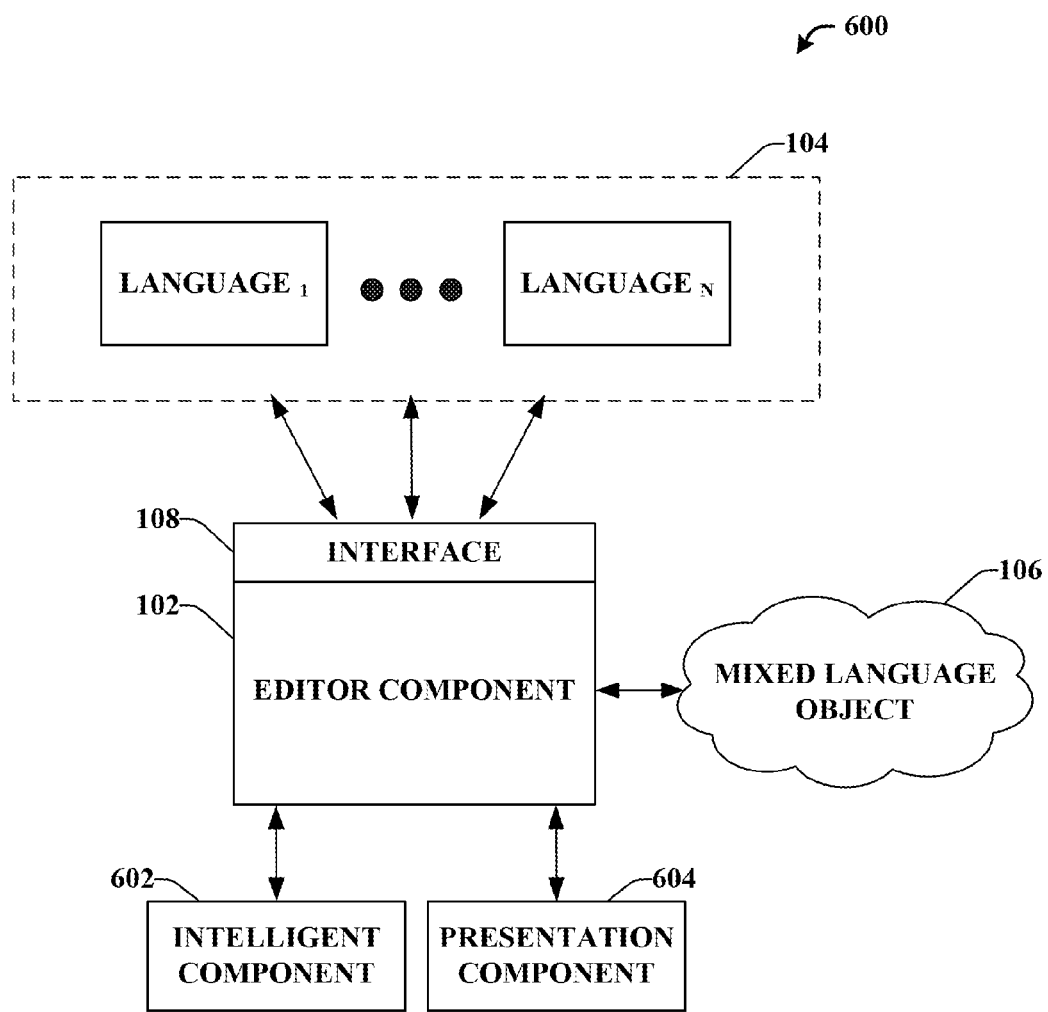
FIG. 6 illustrates a block diagram of an exemplary system that facilitates employing two or more programming languages associated with a standard in order to generate a mixed language object.

FIG. 6 illustrates a system 600 that employs intelligence to facilitate employing two or more programming languages associated with a standard in order to generate a mixed language object. The system 600 can include the editor component 102, the two or more languages 104, the mixed language object or shape 106, and the interface 108 that can all be substantially similar to respective components, languages, objects, shapes, and interfaces described in previous figures. The system 600 further includes an intelligent component 602. The intelligent component 602 can be utilized by the editor component 102 to facilitate utilizing two or more industrial programming languages in order to create an object, a mixed language object, a portion of a process, and/or a shape. Moreover, the intelligent component 602 can be utilized with the editor component 102 to facilitate combining IEC61131 standard language as well as combining existing standard languages to create custom programming languages. For example, the intelligent component 602 can infer optimal programming languages to suggest based on code function, editor layout, import settings, user preferences, user tendencies, graphical properties, document settings, configuration settings, interaction techniques between two or more languages, library settings, custom languages based on user tendencies or use of existing languages, etc.

Moreover, the intelligent component 602 can facilitate utilizing a consumption of a material and the status of such material to an operator role and/or position. For example, the intelligent component 602 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 604 can provide various types of user interfaces to facilitate interaction between a user and any component coupled to the editor component 102. As depicted, the presentation component 604 is a separate entity that can be utilized with the editor component 102. However, it is to be appreciated that the presentation component 604 and/or similar view components can be incorporated into the editor component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the editor component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
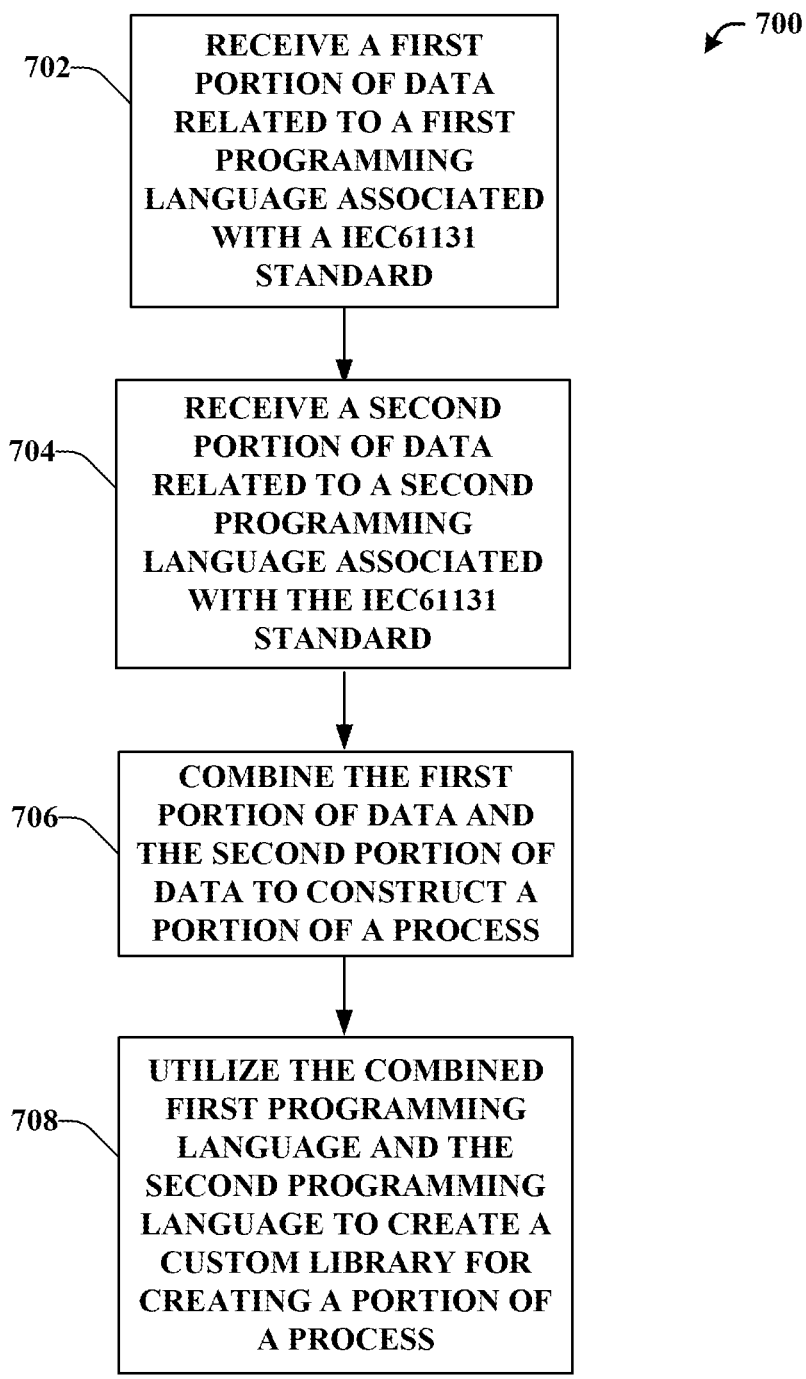
FIG. 7 illustrates an exemplary methodology for utilizing disparate industrial programming languages within a program in order to generate a portion of an industrial process.
Figure 8:
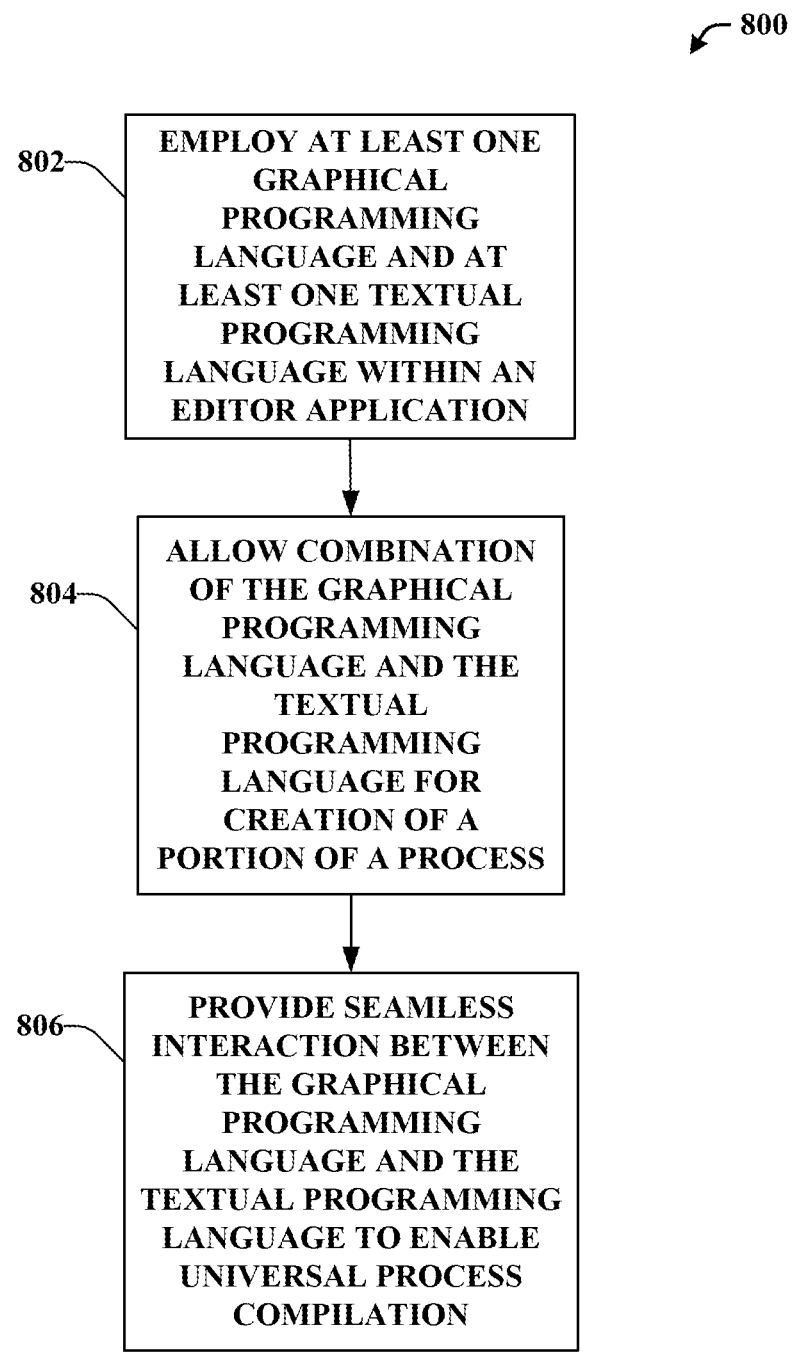
FIG. 8 illustrates an exemplary methodology that facilitates seamless interaction from a first industrial programming language and a second industrial programming language within an editor component.

Referring to FIGS. 7-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for utilizing disparate industrial programming languages within a program in order to generate a portion of an industrial process. At reference numeral 702, a first portion of data related to a first programming language associated with an IEC61131 standard can be received. At reference numeral 704, a second portion of data related to a second programming language associated with the IEC61131. For example, the first programming language and/or the second programming language can be, but is not limited to being, a ladder diagram, a function block diagram, a structured text, an instruction list, a sequential function chart, 61499, any suitable programming language associated with a standard, any suitable programming language associated with an industrial process, etc. In general, the first programming language and/or the second programming language can be a graphical language and/or a textual language.

At reference numeral 706, the first portion of data and the second portion of data can be combined to construct a portion of a process. In other words, the first programming language and the second programming language can be mixed and/or combined together within a single compiler, editor, and the like in order to construct a portion of an industrial process and/or a portion of code. At reference numeral 708, the combined first programming language and the second programming language can be utilized to create a custom library that can be employed to create a portion of a process. For example, a unique or custom combination of a first programming language and a second programming language can be implemented. Such custom combination can be utilized as a custom language and/or library of functions that can be employed to create code and/or portions of a process.

FIG. 8 illustrates a methodology 800 that facilitates seamless interaction from a first industrial programming language and a second industrial programming language within an editor component. At reference numeral 802, at least one graphical programming language and at least one textual programming language can be employed within an editor application. It is to be appreciated that the textual programming language and/or the graphical programming language can be associated with at least one of the IEC61131 standard or the 61499 standard.

At reference numeral 804, a combination of the graphical programming language and the textual programming language can be allowed for the creation of a portion of a process. In other words, within the editor application or software, the mixing of two disparate and unique programming languages can be provided in which such mixing can create a portion of a process or code. At reference numeral 806, a seamless interaction between the graphical programming language and the textual programming language can be provided to enable a universal process compilation.

Figure 9:
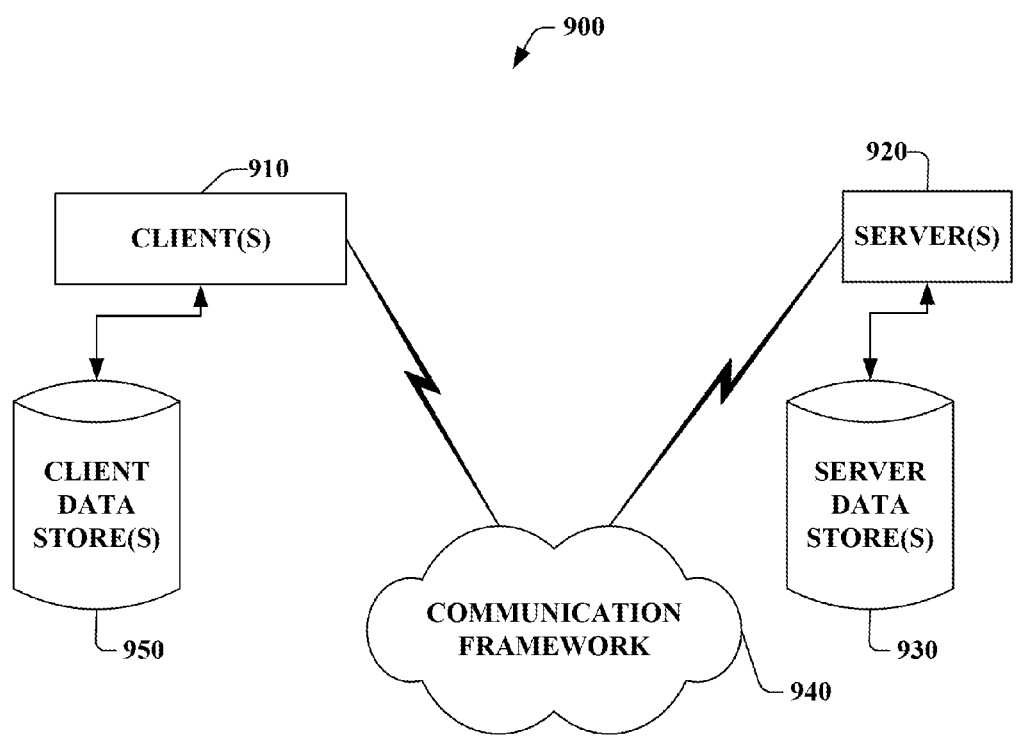
FIG. 9 illustrates an exemplary networking environment, wherein the novel aspects of the claimed subject matter can be employed.
Figure 10:
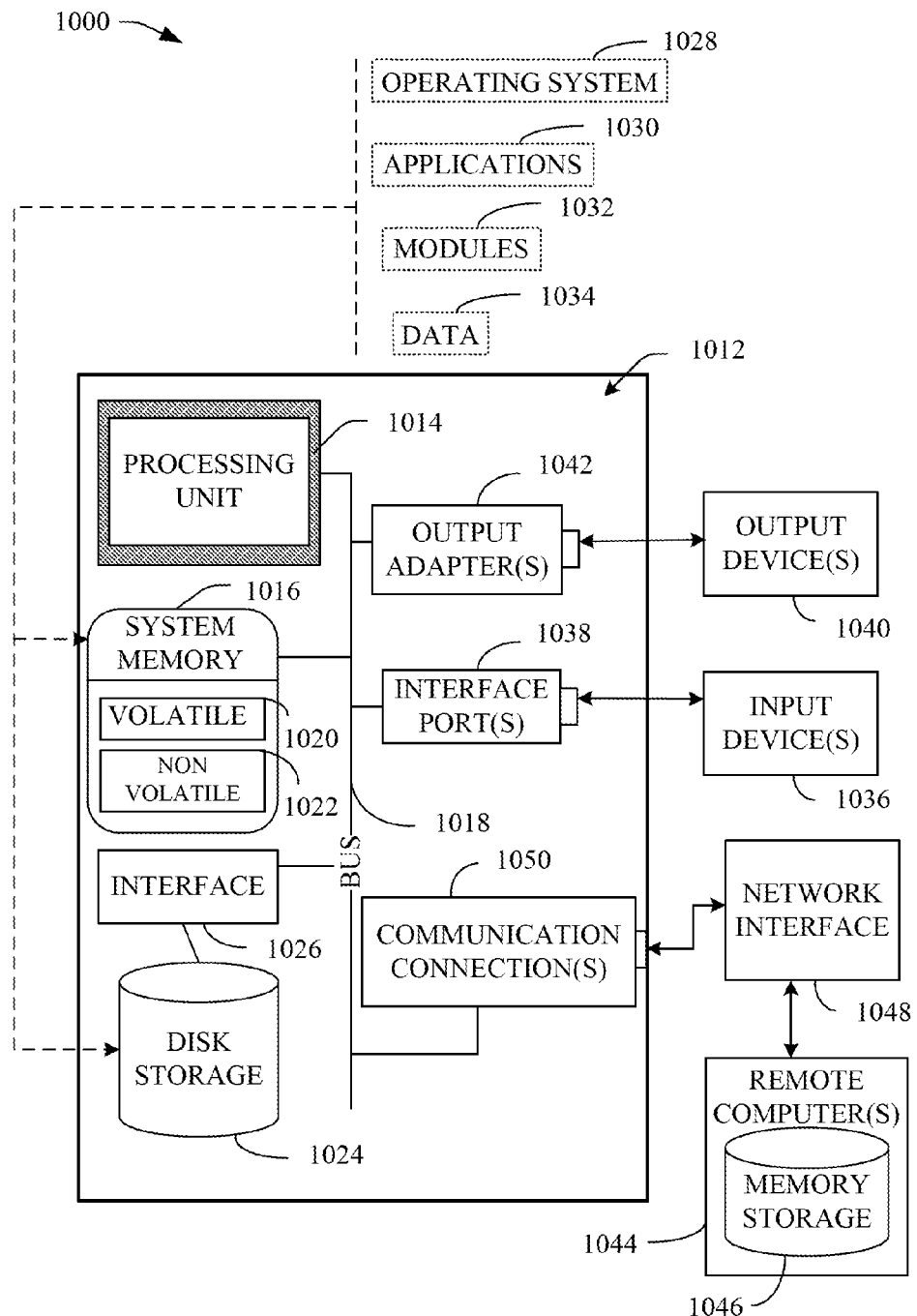
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method, comprising:
   receiving, by a processor, first data from a first programming language and second data from a second programming language, wherein at least one of the first programming language or the second programming language is a graphical programming language; and
   assessing, by the processor, an applicability of the first programming language with regard to programming the industrial controller in accord with a programming language standard utilized in programming industrial controllers;
   assessing, by the processor, an applicability of the second programming language with regard to programming the industrial controller in accord with the programming language standard; and
   combining, by the processor, at least a portion of the first programming language with at least a portion of the second programming language to facilitate creation of a third programming language, wherein the first programming language, the second programming language and the third programming language are disparate and the third programming language is utilized to program the industrial controller in accord with the programming language standard.

2. The method of claim 1, wherein at least one of the first programming language, the second programming language, or the third programming language is at least one of a structured text (ST), an instruction list (IL), a ladder diagram (LD), a function block diagram (FBD), a sequential function chart (SFC), a function chart (FC), C, or C++.

3. The method of claim 1, wherein the programming language standard relates to an IEC61131 standard.

4. The method of claim 1, wherein the programming language standard relates to an IEC61499 standard.

5. The method of claim 1, wherein at least one of the first programming language or the second programming language is a textual programming language, or an object oriented programming language.

6. A system, comprising:
   a memory that stores at least one computer-executable component; and
   a processor, communicatively coupled to the memory, that facilitates execution of the at least one computer-executable component, the at least one computer-executable component, comprising:
   an interface component configured to receive first data from a first programming language and second data from a second programming language, wherein at least one of the first programming language or the second programming language is a graphical programming language; and
   an editor component configured to:
   assess an applicability of the first programming language with regard to programming the industrial controller in accord with a programming language standard utilized in programming industrial controllers;
   assess an applicability of the second programming language with regard to programming the industrial controller in accord with the programming language standard; and
   combine at least a portion of the first programming language with at least a portion of the second programming language to facilitate creation of a third programming language, wherein the first programming language, the second programming language and the third programming language are disparate and the third programming language is utilized to program the industrial controller in accord with the programming language standard.

7. The system of claim 6, wherein at least one of the first programming language, the second programming language, or the third programming language is at least one of a struc-

17 tured text (ST), an instruction list (IL), a ladder diagram (LD), a function block diagram (FBD), a sequential function chart (SFC), a function chart (FC), C, or C++.

8. The system of claim 6, wherein the programming language standard relates to an IEC61131 standard.

9. The system of claim 6, wherein the programming language standard relates to an IEC61499 standard.

10. The system of claim 6, wherein at least one of the first programming language or the second programming language is a textual programming language, or an object oriented programming language.

11. The system of claim 6, wherein the editor component is further configured to create the third programming language in accord with a user definition associated with the programming language standard.

12. The system of claim 6, wherein the editor component comprises a stencil editor component configured to create at least one of a stencil, or a shape associated with a stencil, as a function of the third programming language being created.

13. The system of claim 12, wherein the stencil is a group comprising at least one shape, and the at least one shape is an object defined by at least one of a method or a function.

14. The system of claim 12, wherein the stencil editor component comprises at least one object with at least one functionality respective to the third programming language.

15. The system of claim 12, wherein the stencil editor component is further configured to associate a shape to at least one of an existing function, a function block, or a shape customized with at least one of a user-defined parameter, a snippet of code, a runtime behavior, a runtime perspective, or a graphical representation.

16. The system of claim 6, the at least one computer-executable component further comprising a panel component configured to facilitate a drag-and-drop operation of at least one shape from a selected stencil within a document associated with at least one of the first programming language, the second programming language or the third programming language.

17. The system of claim 16, wherein the panel component is further configured to utilize at least one of a platform or a stencil editor component to facilitate importation of a library for a stencil comprising the at least one shape.

18. The system of claim 6, wherein the editor component is further configured to utilize a first container for the first programming language, a second container for the second programming language, and a third container for the third programming language.

19. The system of claim 6, wherein the editor component is configured to facilitate interaction between any of the first programming language, the second programming language and the third programming language.

20. The system of claim 6, further comprising an import component configured to receive at least a portion of extensible markup language (XML) to facilitate creation of at least a library or a stencil comprising at least one shape generated in association with at least the received portion of XML.

21. The system of claim 6, wherein the editor component is configured to combine the first programming language and the second programming language within a document, wherein the document is saved as at least one of a program organization unit (POU) associated with a concrete automation model (CAM) file or a graphical page associated with a human machine interface (HMI) file.

22. The system of claim 21, wherein the document hosts the first programming language and the second programming language and is supported by an HMI container and a programming language container.

23. The system of claim 1, the at least one computer-executable component further comprising:
a stencil editor component configured to facilitate creation of a custom shape, wherein the custom shape defines a control system object associated with the third programming language; or
a panel component configured to assign a container type to the custom shape, wherein the container type defines a function for the control system object associated with the third programming language.

24. A non-transitory computer-readable storage medium comprising a set of instructions that, in response to execution, cause a computing system to perform operations, comprising:
receiving first data associated with a first programming language;
receiving second data associated with a second programming language;
assessing an applicability of the first programming language regarding programming of the industrial controller according to a standard defining programming of an industrial controller;
assessing an applicability of the second programming language regarding programming of the industrial controller according to the standard, wherein at least one of the first programming language or the second programming language is a graphical programming language; and
combining, in response to assessing the first programming language is applicable to the standard and assessing the second programming language is applicable to the standard, at least a portion of the first programming language with at least a portion of the second programming language, to facilitate creating a third programming language, wherein the first programming language, second programming language and third programming language are disparate and the third programming language facilitates generation of a representation of at least a portion of an industrial process associated with the industrial controller.

25. The computer-readable storage medium of claim 24, wherein the third programming language being created according to a user definition associated with the standard.

26. The computer-readable storage medium of claim 24, further comprising:
creating a shape associated with the third programming language, wherein the shape defines a control system object; and
assigning a container type to the shape, wherein the type defines a function of the control system object.

27. A method, comprising:
creating, by a processor, a stencil comprising a first shape, the first shape is defined by combination of at least one element comprising a first programming language and at least one element comprising a second programming language to form a third programming language, wherein the first programming language and the second programming language are disparate;
displaying, by the processor, the first shape, wherein the panel component is further configured to facilitate a drag-and-drop operation for the first shape to facilitate construction of a representation of at least a first portion of an industrial automation process within a document representing the industrial automation process; and
combining, by the processor, the first shape with a second shape, wherein the second shape is defined by a combination of at least one element comprising the first programming language and a fourth programming language to form a fifth programming language to facilitate construction of a second portion of the industrial automation process, the first shape and the second shape interact while being formed from at least one disparate language, and the first programming language and the fourth programming language are disparate.

28. A compiler, comprising:
a processor; and
a computer readable storage medium communicatively coupled to the processor and storing computer executable components, comprising:
a stencil builder configured to create a stencil comprising a first shape, the first shape is defined by combination of at least one element comprising a first programming language and at least one element comprising a second programming language to form a third programming language, wherein the first programming language and the second programming language are disparate;
a panel component configured to display the first shape, wherein the panel component is further configured to facilitate a drag-and-drop operation for the first shape to facilitate construction of a representation of at least a first portion of an industrial automation process within a document representing the industrial automation process; and
an editor configured to combine the first shape with a second shape, wherein the second shape is defined by a combination of at least one element comprising the first programming language and a fourth programming language to form a fifth programming language to facilitate construction of a second portion of the industrial automation process, the first shape and the second shape interact while being formed from at least one disparate language, and the first programming language and the fourth programming language are disparate.

29. The compiler of system 28, wherein the document is configured to enforce a separate container for each of the first programming language and the second programming language.

30. The compiler of claim 28, wherein the first programming language and the second programming language respectively comprise at least one of a structured text (ST), an instruction list (IL), a ladder diagram (LD), a function block diagram (FBD), a sequential function chart (SFC), a function chart (FC), C, or C++.

31. The compiler of claim 28, wherein the first programming language and the second programming language relate to an IEC61131 standard.

32. The compiler of claim 28, wherein the first programming language and the second programming language relate to an IEC61499 standard.

33. The compiler of claim 28, wherein the first programming language and the second programming language respectively comprise a graphical programming language or a textual programming language.

34. A non-transitory computer-readable medium having instructions stored thereon that, in response to execution, cause a system including a processor to perform operations comprising:
creating a stencil comprising a first shape, the first shape is defined by combination of at least one element comprising a first programming language and at least one element comprising a second programming language to form a third programming language, wherein the first programming language and the second programming language are disparate;
displaying the first shape, wherein the panel component is further configured to facilitate a drag-and-drop operation for the first shape to facilitate construction of a representation of at least a first portion of an industrial automation process within a document representing the industrial automation process; and
combining the first shape with a second shape, wherein the second shape is defined by a combination of at least one element comprising the first programming language and a fourth programming language to form a fifth programming language to facilitate construction of a second portion of the industrial automation process, the first shape and the second shape interact while being formed from at least one disparate language, and the first programming language and the fourth programming language are disparate.

* * * * *